UNITED STATES PATENT OFFICE.

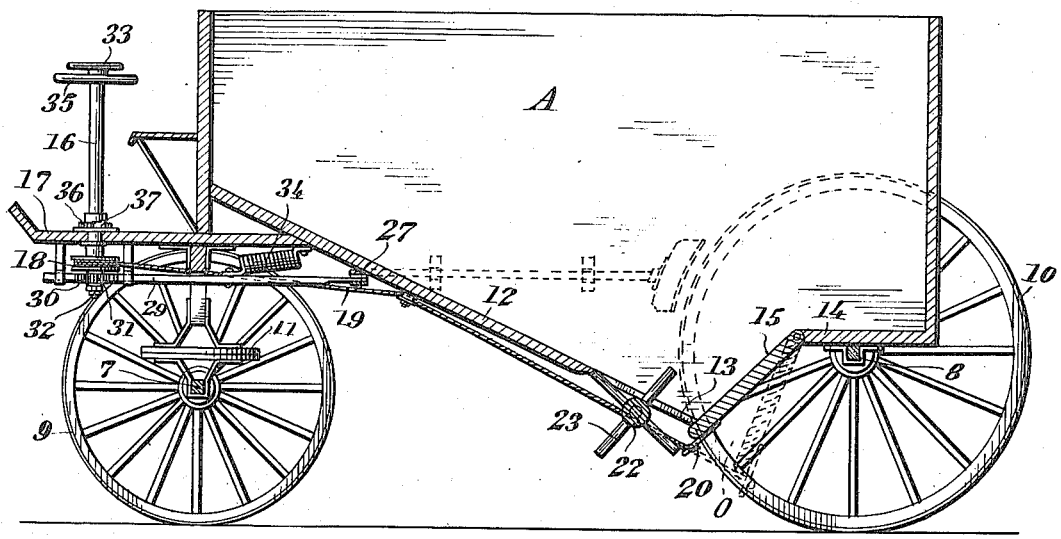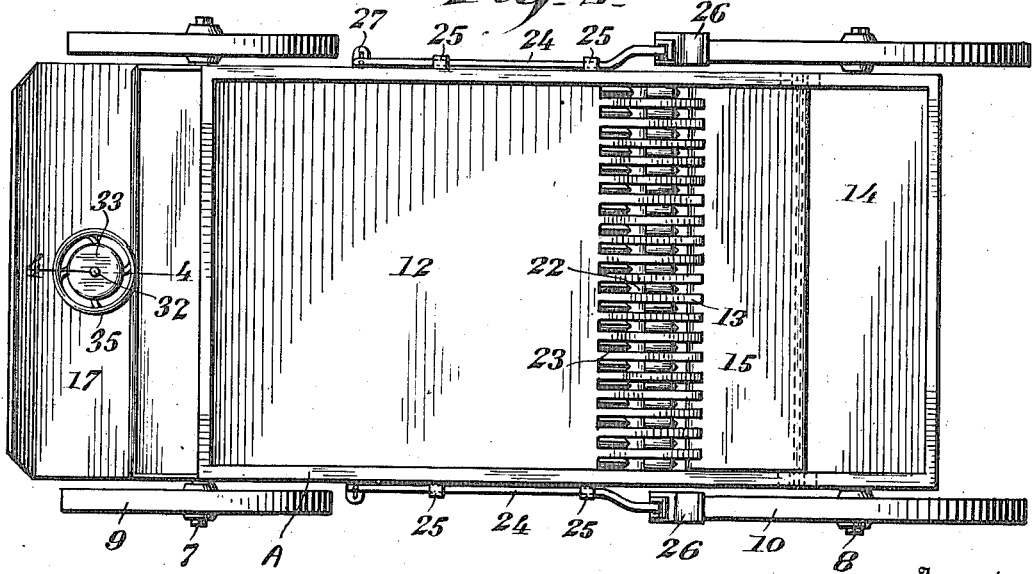

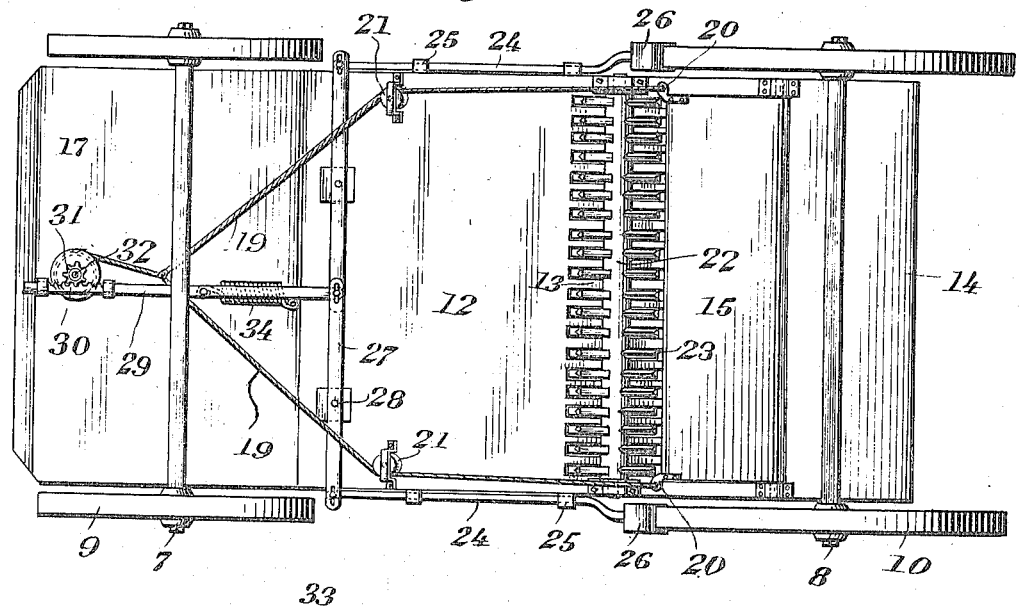
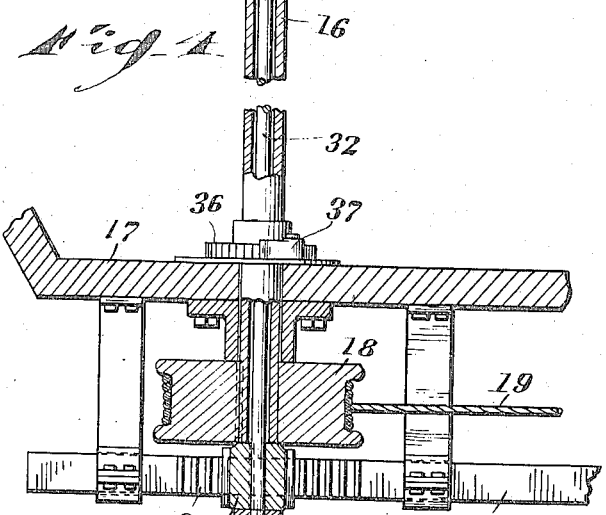
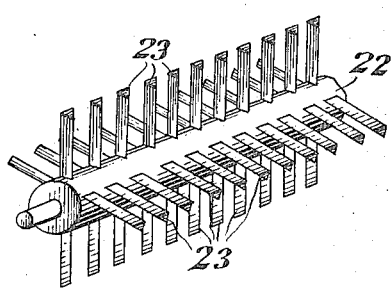

THOMAS DAVIDSON, OF GLADWYNE, PENNSYLVANIA.

DUMP-WAGON.

1,152,303.  Specification of Letters Patent.  Patented Aug. 31, 1915.

Application filed July 21, 1914. Serial No. 852,238.

*To all whom it may concern:*

Be it known that I, THOMAS DAVIDSON, a citizen of the United States, residing at Gladwyne, in the county of Montgomery and State of Pennsylvania, have invented new and useful Improvements in Dump-Wagons, of which the following is a specification.

This invention relates to dump wagons, and it has for its object to produce a dump wagon of simple and efficient construction from which the load may be readily discharged in such a manner as to be spread or scattered evenly on the ground.

A further object of the invention is to produce a simple and efficient dump wagon in which the discharge of the load may be gaged and regulated, the material discharged being spread or scattered on the ground.

A further object of the invention is to provide simple and efficient means for controlling the discharge of material from the wagon in connection with brake operating means.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a longitudinal vertical sectional view of a dump wagon constructed in accordance with the invention. Fig. 2 is a top plan view of the same. Fig. 3 is a bottom plan view. Fig. 4 is a sectional detail view, enlarged, taken on the line 4—4 in Fig. 2. Fig. 5 is a perspective detail view of a portion of the spreader.

Corresponding parts in the several figures are denoted by like characters of reference.

The wagon box A is supported on a suitable running gear including front and rear axles 7 and 8, front and rear wheels 9 and 10 and a fifth wheel 11. The box A has a bottom including a front member 12 which is inclined downwardly and rearwardly and which is provided at its rear end with a series of fingers or teeth 13 combining to constitute a comb. The bottom of the wagon box further includes a stationary member 14 which has been shown as being supported directly on the rear axle and with which is hingedly connected a door or valve 15 which constitutes a closure for the space or opening intervening between the edge of the comb formed by the teeth 13 and the front edge of the bottom member 14, said opening being indicated by O in Fig. 1 of the drawings where the valve 15 is shown partly open in dotted lines in order that the location of said opening may be clearly understood.

For the purpose of adjusting the closure 15 to various positions and retaining it in adjusted position means are employed including a tubular shaft 16 which is supported for rotation on the foot board 17 in a position conveniently accessible to the driver, said shaft carrying a drum 18 which is connected by flexible elements, such as ropes or cables 19, with lugs or brackets 20 adjacent to the side edges of the closure member 15. The ropes 19 are guided over suitably arranged pulleys 21, and it will be readily seen that by rotating the drum 18 in one direction so as to wind the ropes thereon, the closure 15 will be placed in an obstructing position, while by rotating the drum in the opposite direction, the closure member will gradually gravitate to a non-obstructing position, the area of the space between the closure member and the edge of the comb being gradually increased so as to regulate the escape of the contents of the wagon box.

Supported for rotation in bearings adjacent to the underside of the comb formed by the teeth 13 is a spreader comprising a cylinder 22 having radially extending arms 23 which are suitably spaced to pass between the spaces intermediate the teeth 13. The cylindrical body of the spreader being beneath the teeth 13 is located wholly out of the path of material passing through the opening O, formed by swinging the valve 15 away from the edge of the comb formed by said teeth. The cylinder 22 is preferably provided with four series of radially extending arms, disposed approximately 90 degrees apart so that at least one set or series of said arms will at all times project upwardly through the spaces between the teeth 13, and that the arms thus projecting upwardly will lie directly in the path of material passing over the inclined plane of the bottom member 12 and through the opening O. It follows that when material is being discharged from the wagon box and such material passes over the inclined plane presented by the bottom member 12, the upwardly projecting arms 23 will be engaged thereby, and the spreader will be rotated with the effect of scattering the material discharged. The operation of the spreader is further assisted by material discharged over the inclined plane presented by the closure member 15 which will be directed against the arms of the spreader that project downwardly beneath the teeth 13, thereby insuring the operation and increasing the efficiency of the device.

Brake bars 24 are slidably supported in keepers 25 on the sides of the wagon box, said bars carrying the brake shoes 26 that engage the hind wheels 10. The forward ends of the bars 24 are connected with the outwardly extending arms of brake levers 27 fulcrumed at 28, the inwardly extending arms of said levers being connected with a slide 29 having a rack 30 that engages a pinion 31 fixed on the lower end of a shaft 32 which is supported for rotation within the tubular shaft 16 and which is provided at its upper end with a hand wheel 33, whereby it may be rotated for the purpose of setting the brakes. A spring 34 is provided for the purpose of retracting the brakes. The tubular shaft 16 is also provided with a hand wheel 35 whereby it may be rotated for the purpose of adjusting the position of the valve or closure member 15, and the shaft 16 is, furthermore, provided with a ratchet wheel 36 engaged by a pawl 37 for the purpose of preventing reverse rotation.

From the foregoing description, taken in connection with the drawings hereto annexed, the operation and advantages of this invention will be readily understood. The load carried in the box A may be discharged quickly or slowly, as may be preferred, by regulating the adjustment of the closure member 15, and while being discharged the material composing the load will cause the rotation of the spreader, whereby the said material is spread or scattered. The device will also serve in a measure to break up such lumps and clods as may be contained in the load.

It will be understood that while fine material may to some extent sift out between the teeth 13 of the device, the interspaces between said teeth are not to be regarded as constituting discharge openings, said interspaces being as a matter of fact largely obstructed by the arms of the spreading device. The only discharge opening properly regarded as such is the space between the edge of the comb and the free edge of the valve 15, which latter, by the means provided, may be moved to an obstructing position and may also be controlled in such fashion that the area of the discharge opening may be accurately regulated.

Fertilizer distributers and analogous machines have heretofore been provided with rotary spreading or distributing members located in the path of material escaping over an inclined surface for the purpose of distributing and scattering such material. Such rotary spreading elements, however, have heretofore been universally arranged to be driven positively by power derived from some suitable source usually from a wheel or wheels supporting the container for the material. The action of such spreaders or distributers has universally been to pull the material from the container for the purpose of throwing or scattering it on the ground. Under my present invention the rotary spreading element is operated solely by impact of the material that escapes gravitationally over the inclined surface of the bottom member of the container, and its action is partly to obstruct the passage of said material and partly to spread or scatter the same as it is being delivered. For the purpose of clearly distinguishing between my invention and the prior art I have elected to designate the rotary spreading member as "impact-actuated," meaning thereby that it is actuated solely by the impact of the escaping material in contradistinction to any power mechanically applied for the purpose of causing rotary movement.

Having thus described my invention, what is claimed as new, is:—

1. A dump wagon having a discharge opening, means for obstructing and varying the area of said opening, and an impact-actuated spreader including a cylinder supported for rotation near the path of material escaping gravitationally through the discharge opening and having arms extending in the path of such escaping material whereby the spreader is adapted to be rotated solely by the action of such material.

2. A dump wagon having an escape opening, a valve adapted to obstruct and to vary the area of said escape opening, an impact-actuated spreading member supported for rotation adjacent to said opening and to the path of material escaping therethrough, and arms extending from said rotary member in the path of material escaping through the opening whereby the member will be caused to rotate solely by the impact of material against the arms.

3. A dump wagon having an escape opening bounded on one side by a stationary member having terminal teeth forming a comb and on the opposite side by a movably supported closure member, means for adjusting said closure member to vary the area of the opening and to obstruct the latter by moving said closure member into engagement with the edge of the comb, and a rotary impact-actuated member supported beneath the comb and having radial arms projecting between the teeth thereof.

4. In a dump wagon, a body having a downwardly and rearwardly inclined bottom member provided with a series of teeth forming a comb at the rear edge thereof, a stationary bottom member arranged to the rear of and spaced from the rear edge of the first mentioned bottom member, a valve connected hingedly with the stationary bottom member, and movable in the direction of the comb, means for effecting adjustment of the valve into and out of engagement with the edge of the comb to obstruct the space between the comb and the stationary rearward bottom member and to vary the area of the opening therebetween, and a rotary impact-actuated member supported beneath the comb and having arms some of which project between the teeth thereof.

5. In a dump wagon, a wagon box having a bottom including a stationary inclined member, a stationary horizontal member, and a valve member hingedly connected with the stationary horizontal member and having its free end movable with respect to and into engagement with the inclined horizontal member, the latter being provided with a comb at the edge thereof, and a rotary impact-actuated member supported beneath the comb and having radial arms extending between the teeth thereof.

6. In a dump wagon having a box with an inclined bottom member over which the contents of the box may be gravitationally discharged, an impact-actuated spreader supported for rotation adjacent to the lower end of said bottom member.

7. In a dump wagon having a box with an inclined bottom member over which the contents of the box may be gravitationally discharged, an impact-actuated spreader supported for rotation adjacent to the lower end of said bottom member, and a gate valve to control the escape of material from the box.

In testimony whereof I affix my signature in presence of two witnesses.

THOMAS DAVIDSON.

Witnesses:
ELWOOD W. CLAYPOOLE,
RALPH N. WARNER, Jr.